US009193082B2

(12) United States Patent
Kawase et al.

(10) Patent No.: US 9,193,082 B2
(45) Date of Patent: Nov. 24, 2015

(54) CUTTING PLOTTER AND NON-TRANSITORY COMPUTER-READABLE STORAGE MEDIUM

(71) Applicants: Kei Kawase, Nagoya (JP); Masahiko Nagai, Nagoya (JP); Junnosuke Matsuda, Nagoya (JP); Tomoyasu Niizeki, Ichinomiya (JP); Noriharu Tashiro, Nagoya (JP)

(72) Inventors: Kei Kawase, Nagoya (JP); Masahiko Nagai, Nagoya (JP); Junnosuke Matsuda, Nagoya (JP); Tomoyasu Niizeki, Ichinomiya (JP); Noriharu Tashiro, Nagoya (JP)

(73) Assignee: BROTHER KOGYO KABUSHIKI KAISHA, Nagoya-shi (JP)

( * ) Notice: Subject to any disclaimer, the term of this patent is extended or adjusted under 35 U.S.C. 154(b) by 485 days.

(21) Appl. No.: 13/851,630

(22) Filed: Mar. 27, 2013

(65) Prior Publication Data

US 2013/0255458 A1 Oct. 3, 2013

(30) Foreign Application Priority Data

Mar. 27, 2012 (JP) ................................ 2012-071476

(51) Int. Cl.

*G06F 19/00* (2011.01)
*B26D 5/00* (2006.01)
*B26D 5/06* (2006.01)
*B26D 7/28* (2006.01)

(Continued)

(52) U.S. Cl.

CPC *B26D 5/005* (2013.01); *B26D 5/06* (2013.01); *B26D 7/28* (2013.01); *B26F 1/3806* (2013.01); *B26D 3/085* (2013.01); *Y10T 83/162* (2015.04)

(58) Field of Classification Search

CPC ... B26D 5/005; B26D 2007/2678; B26D 5/06
See application file for complete search history.

(56) References Cited

U.S. PATENT DOCUMENTS

| | | | | |
|---|---|---|---|---|
| 2005/0186010 A1 | 8/2005 | Shibata et al. | | |
| 2011/0056421 A1* | 3/2011 | Kawaguchi ............ | D05B 19/10 112/470.01 | |
| 2011/0088605 A1* | 4/2011 | Kawaguchi ............ | D05B 19/04 112/470.01 | |

(Continued)

FOREIGN PATENT DOCUMENTS

| | | | |
|---|---|---|---|
| JP | 2005-205539 A | | 8/2005 |
| JP | 2011005502 A | * | 1/2011 |
| JP | 2013013977 A | * | 1/2013 |

OTHER PUBLICATIONS

Nery, E. W., & Kubota, L. T. (2013). Sensing approaches on paper-based devices: A review. Analytical and Bioanalytical Chemistry, 405(24), 7573-7595.*

(Continued)

*Primary Examiner* — Michael D Masinick
(74) *Attorney, Agent, or Firm* — Fox Rothschild LLP

(57) ABSTRACT

A cutting plotter includes a processor and a memory. The memory stores computer-readable instructions that cause the processor to perform setting, counting, storing, and notifying when executed. The setting sets a plurality of partial areas by dividing a cuttable area of a holding member, the cuttable area is an area in which a cutting object is to be detachably adhered. The counting counts a number of cuts by a cutting blade within the cuttable area for each of the plurality of partial areas. The storing stores each of count values associated with each of the plurality of partial areas in a storage portion, each of the count values is counted by the counting for each of the plurality of partial areas. The notifying notifies, based on the count values stored in the storage portion, information relating to the number of cuts for each of the plurality of partial areas.

14 Claims, 11 Drawing Sheets

(51) Int. Cl.
*B26F 1/38* (2006.01)
*B26D 3/08* (2006.01)

(56) References Cited

U.S. PATENT DOCUMENTS

2011/0088606 A1* 4/2011 Kawaguchi ............ D05B 19/04 112/470.04
2012/0247292 A1* 10/2012 Kawaguchi ............ B26D 5/005 83/76.1
2013/0255458 A1* 10/2013 Kawase ................. B26D 5/005 83/76.1
2014/0182431 A1* 7/2014 Hasegawa ............. B26F 1/3813 83/72

OTHER PUBLICATIONS

Bartholomeusz, D.A.; Boutte, R.W.; Andrade, J.D., “Xurography: rapid prototyping of microstructures using a cutting plotter,” in Microelectromechanical Systems, Journal of , vol. 14, No. 6, pp. 1364-1374, Dec. 2005.*

* cited by examiner

| | |
|---|---|
| BASIC SIZE INFORMATION OF CUT DATA | LONGITUDINAL |
| | LATERAL |
| CUT LINE DATA OF CUT DATA | (X1,Y1) |
| | (X2,Y2) |
| | (X3,Y3) |
| | ⋮ |

| CUTTABLE AREA A | CUT COUNT cnt |
|---|---|
| (1,1) PARTIAL AREA | cnt 1 |
| (1,2) PARTIAL AREA | cnt 2 |
| (1,3) PARTIAL AREA | cnt 3 |
| (2,1) PARTIAL AREA | cnt 4 |
| (2,2) PARTIAL AREA | cnt 5 |
| (2,3) PARTIAL AREA | cnt 6 |
| ⋮ | ⋮ |
| (4,2) PARTIAL AREA | cnt 11 |
| ⋮ | ⋮ |
| (5,3) PARTIAL AREA | cnt 15 |

FIG. 8

CUTTING PLOTTER AND NON-TRANSITORY COMPUTER-READABLE STORAGE MEDIUM

CROSS-REFERENCE TO RELATED APPLICATION(S)

This application is based upon and claims the benefit of priority from the prior Japanese Patent Application 2012-071476, filed on, Mar. 27, 2012, the entire contents of which are incorporated herein by reference.

FIELD

The present disclosure relates to a cutting plotter that cut a desirable pattern from a cutting object and a non-transitory computer-readable medium storing a control program of the cutting plotter.

BACKGROUND

Conventionally, a cutting plotter that automatically cuts a sheet, e.g., a paper, has been known. The sheet is to be adhered to a base member which is an example of a holding member. An adhesive layer is provided on a surface of the base member. The cutting plotter pinches both side edges of the base member in an up-down direction by a driving roller and a pinch roller of a driving mechanism, and move the base member in a first direction. The cutting plotter moves a carriage that includes a cutter in a second direction perpendicular to the first direction. A desirable pattern is cut from the sheet by relative movements between the base member and the cutter.

After finishing the cut of the pattern, the cutting plotter moves the base member to the first direction by the driving roller and the pinch roller, and ejects the base member therefrom. The pattern cut from the sheet and residuals of the sheet are removed manually from the base member by a user. If another pattern is cut sequentially, a new sheet is adhered to the base member. The base member is used iteratively.

SUMMARY

In the cutting plotter described above, when the sheet is cut, a tip of the cutter penetrates the sheet and reaches the surface of the base member. Scratches made by the cutter remain on the base member. Thus, the scratches accumulate in the base member as the base member is used iteratively. The accumulated scratches may gradually prevent the sheet from being cut smoothly. The adhesive force of the base member gradually decreases; the base member would lose a substantial adhesive force to hold the sheet. Since the base member is a consumable item having a finite number of times that the sheet endures being used, it has been desired to increase the number of times that the sheet endures being used as possible.

A purpose of the present disclosure is to provide a cutting plotter that can prevent a performance of the base member from deteriorating in accordance with increasing a number of times that the base member is used and a non-transitory computer-readable medium storing a control program of the cutting plotter.

An aspect of the present disclosure may provide a cutting plotter including a processor and a memory. The memory stores computer-readable instructions. The instructions, when executed by the processor, cause the processor to perform setting, counting, storing, and notifying. The setting sets a plurality of partial areas by dividing a cuttable area of a holding member, the cuttable area is an area in which a cutting object is to be detachably adhered. The counting counts a number of cuts by a cutting blade within the cuttable area for each of the plurality of partial areas. The storing stores each of count values associated with each of the plurality of partial areas in a storage portion, each of the count values is counted by the counting for each of the plurality of partial areas. The notifying notifies, based on the count values stored in the storage portion, information relating to the number of cuts for each of the plurality of partial areas.

BRIEF DESCRIPTION OF THE DRAWINGS

FIG. 8 is one example of a chart for explaining a number of cuts represented as cut count stored for each of multiple partial areas.

DETAILED DESCRIPTION

One configuration of the present disclosure is described with reference to FIGS. 1 to 11.

Figure 1:
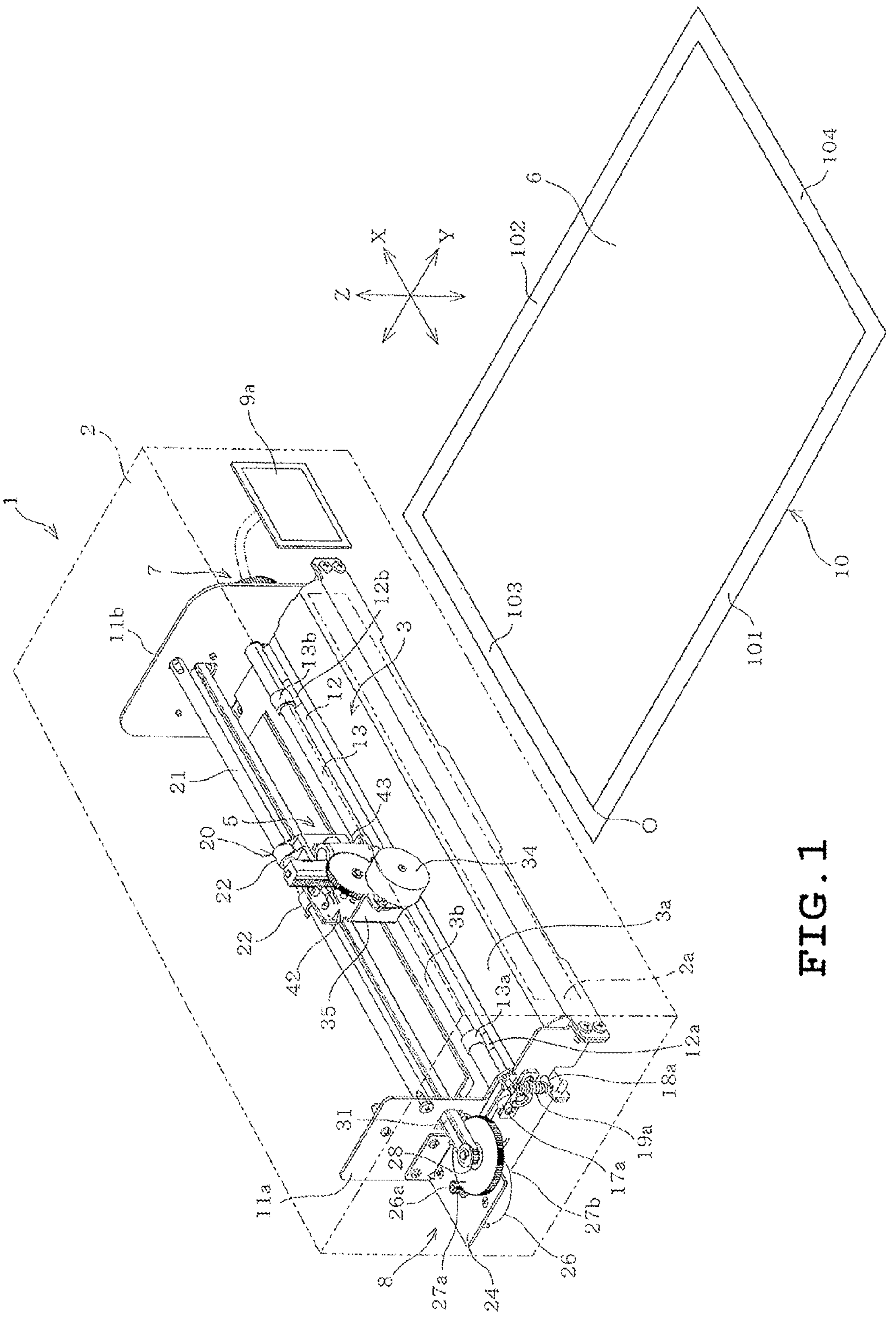
FIG. 1 is one example of a perspective view illustrating the inner structure of a cutting apparatus.
Figure 3C:
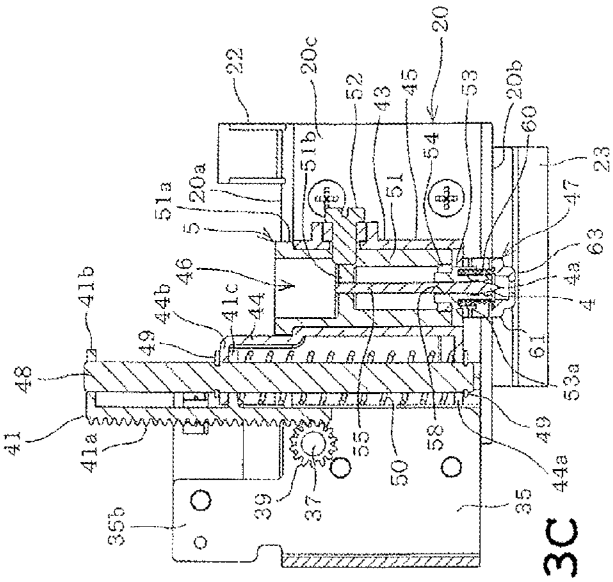
FIG. 3C is an example of a cross sectional view taken along line IIIc-IIIc of FIG. 3B.

Referring to FIG. 1, the cutting apparatus 1 is provided with a main cover 2 serving as a housing, a platen 3 disposed inside the main cover 2, and a cutter holder 5 holding a cutter 4 shown in FIG. 3C. The cutting apparatus 1 is further provided with a carriage 20 supporting the cutter holder 5, and a first transfer unit 7 and a second transfer unit 8 for allowing relative movement of the cutter 4 and a workpiece 6.

The main cover 2 is shaped like a laterally elongate rectangular box. On the front face of the main cover 2, a laterally elongate opening 2*a* is formed. Through the opening 2*a*, a holding sheet 10 holding a workpiece 6 may be placed on the upper surface of the platen 3. In the following description, the direction in which a user positions him/herself relative to the cutting apparatus 1 is referred to as the forward direction and the direction opposite the forward direction as the rearward direction. The forward and rearward direction is also referred to as a Y direction and the direction orthogonal to the Y direction is referred to as an X direction.

Provided on the right side of the main cover 2 is a liquid crystal color display which is capable of displaying in full color and which is hereinafter referred to as display 9*a* for simplicity. Display 9*a* serves a display unit that presents images of various patterns and messages addressed to the user. Provided further on the right side of the main cover 2 is a plurality of control switches 9*b* shown in FIG. 6 which is controlled by the user for providing various instructions and making selections and inputs. For example, the user may select a given pattern from those presented on the display 9*a* and specify various parameters as well as input instructions for execution of various functionalities through the operation of the control switches 9*b*.

The platen 3 comprises a pair of front plate 3*a* and a rear plate 3*b* and the upper surface of the platen 3 exhibits a substantially horizontal plane which is hereinafter also referred to as an XY plane. The platen 3 is configured to receive the underside of holding sheet 10 when cutting the workpiece 6. The upper surface of the holding sheet 10 includes an adhesive layer 10*v* shown in FIGS. 4 and 5A which is formed by applying an adhesive on the area of the upper surface surrounded by peripheral edge portions 101 to 104. The user may stick or attach the workpiece 6 on the adhesive layer 10*v* to allow the workpiece 6 to be held by the holding sheet 10.

Figure 2:
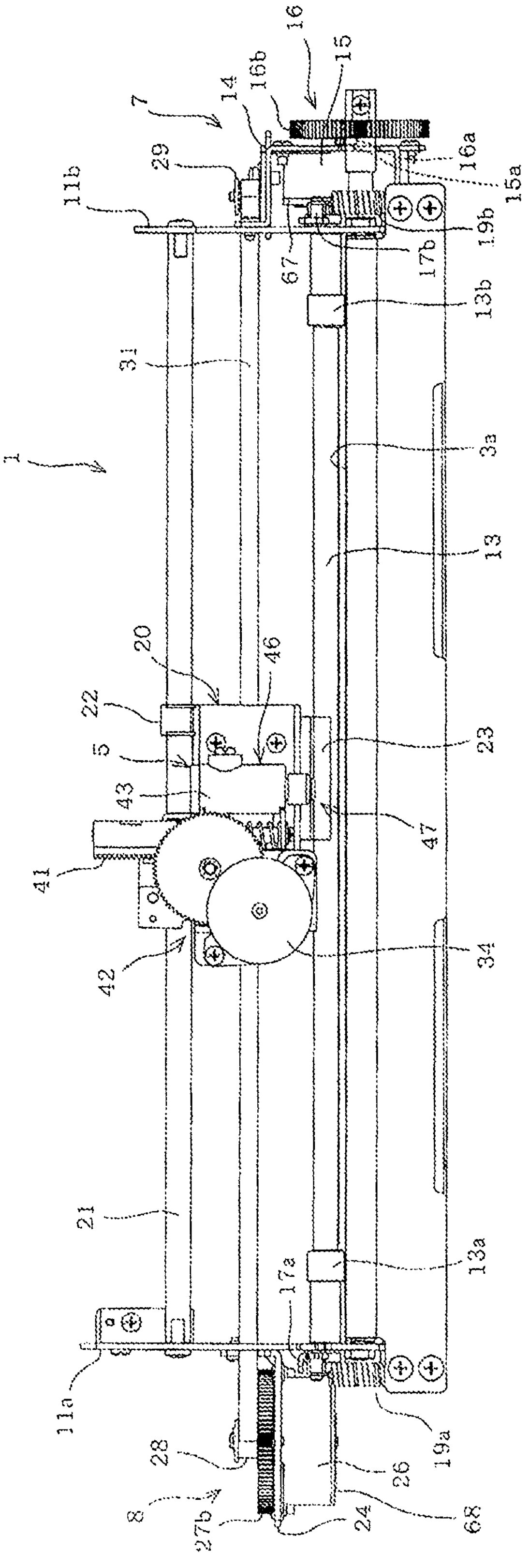
FIG. 2 is one example of a front view of the cutting apparatus.

The first transfer unit 7 transfers the holding sheet 10 in the Y direction also referred to as a first direction across the upper surface of the platen 3 and is configured as described below. Inside the main cover 2, sidewalls 11*a* and 11*b* are provided so as to be located on the left and right sides of the platen 3. A drive roller 12 and a pinch roller 13 extend in the left and right direction across the sidewalls 11*a* and 11*b* so as to be located between the front plate 3*a* and the rear plate 3*b* of the platen 3. The drive roller 12 and the pinch roller 13 are supported by the sidewalls 11*a* and 11*b* so as to be rotatable with respect to the sidewalls 11*a* and 11*b*. The drive roller 12 and the pinch roller 13 extend along a plane parallel with the XY plane and the pinch roller 13 is disposed above the drive roller 12. Referring to FIG. 2, on the outer surface of the right sidewall 11*b*, a first mount plate 19 is attached so as to be located rearward relative to the right end of the drive roller 12. The first mount plate 14 is shaped like a crank and a Y-axis motor 15 is secured on the inner side of the first mount plate 14.

The Y-axis motor 15 comprises, for instance, a stepper motor which is also known as a pulse motor. A rotary shaft 15*a* of the Y-axis motor 15 penetrates through the first mount plate 14 and at the end of the rotary shaft 15*a*, a drive gear 16*a* is attached. The drive gear 16*a* is meshed with a follower gear 16*b* provided on the right end of the drive roller 12. The drive gear 16*a* and the follower gear 16*b* constitute a first deceleration gear mechanism 16.

Figure 6:
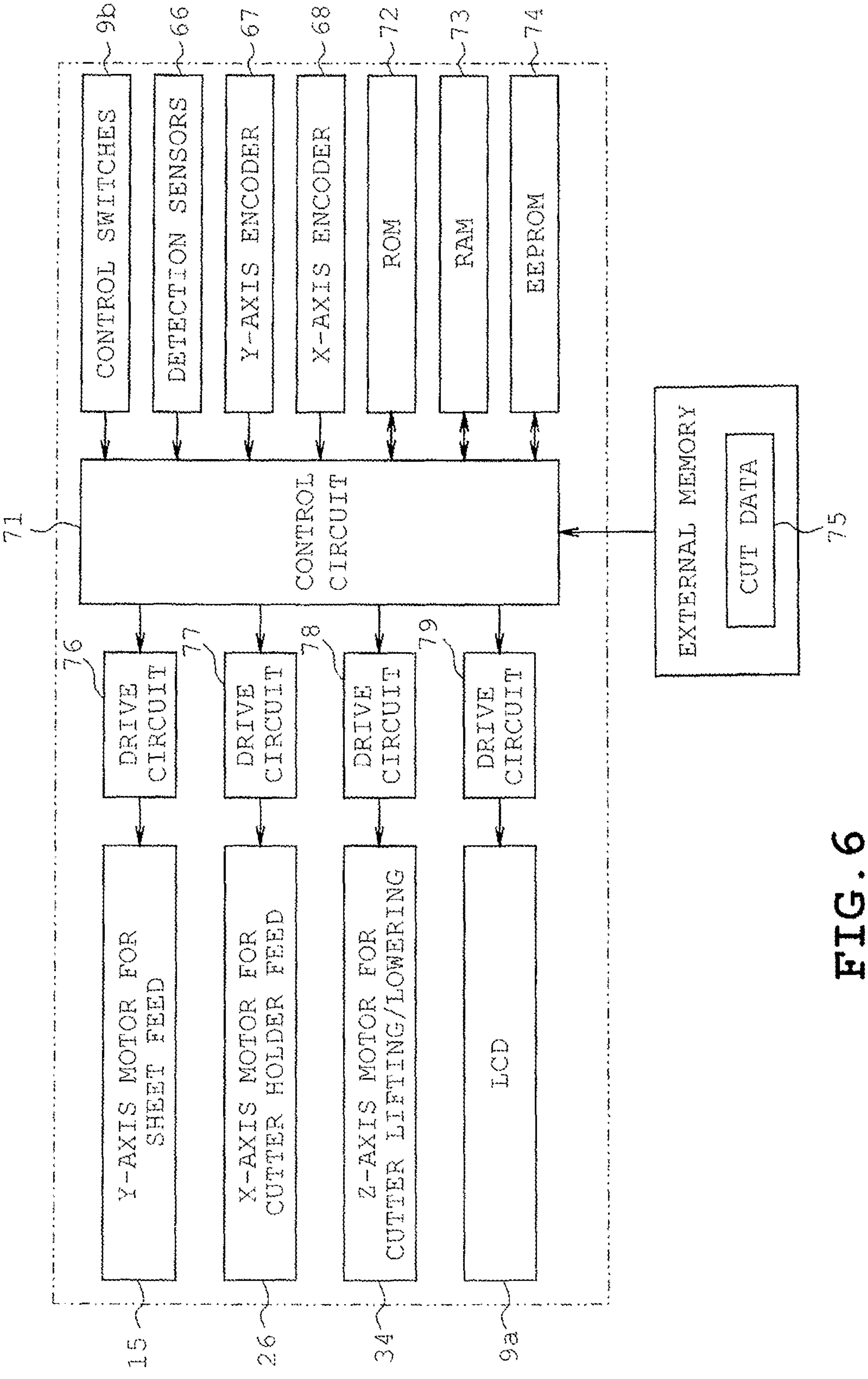
FIG. 6 is one example of a block diagram schematically illustrating an electric configuration.

On the left side of the Y-axis motor 15, a Y-axis encoder 67 is provided which is shown in FIG. 6 and later described. On each of the left and right sidewalls 11*a* and 11*b*, spring mounts 17*a* and 17*b* are provided respectively so as to cover the left and right ends of the pinch roller 13. Further, on the outer surface of each of the left and right sidewalls 11*a* and 11*b*, spring mounts 18*a* are provided respectively so as to protrude from the outer surface of sidewalls 11*a* and 11*b*. Only the left side spring mount 18*a* is shown in FIG. 1. Coil springs 19*a* and 19*b* are mounted on the spring mounts 17*a* and 17*b* and the spring mounts 18*a* and 18*b*, so as to be extend between the spring mounts 17*a* and 17*b* and the spring mounts 18*a* and 18*b*. Thus, the pinch roller 13 is constantly biased downward by the coil springs 19*a* and 19*b*. Near the left and right side ends of the pinch roller 13 proximal to the sidewalls 11*a* and 11*b*, a pair of left and right depressors 13*a* and 13*b* is provided that have outer diameters slightly larger than those of other portions of the pinch roller 13. The depressors 13*a* and 13*b* of the pinch roller 13 contact and depress the left and right side edge portions 101 and 102 of the holding sheet 10. The drive roller 12 similarly has depressors 12*a* and 12*b* at locations corresponding to the depressors 13*a* and 13*b*. The carriage 20 supporting the cutter holder 5 moves along the portion of pinch roller 13 located between depressors 13*a* and 13*b*.

The holding sheet 10 is held between the overlying pinch roller 13 and the underlying drive roller 12 so as to be depressed by the elasticity of the coil springs 19*a* and 19*b* and the weight of components such as the carriage 20. The forward/reverse rotation of the Y-axis motor 15 is transmitted to the drive roller 12 by way of the first deceleration gear mechanism 16 to feed the holding sheet 10 as well as the workpiece 6 rearward or forward. The components such as the drive roller 12, the pinch roller 13, the Y-axis motor 15, the first deceleration gear mechanism 16, and the coil springs 19*a* and 19*b* constitute the first transfer unit 7.

The second transfer unit 8 transfers the carriage 20 as well as the cutter holder 5 in the X direction also referred to as the second direction. More specifically, between the upper end portions of the left and right sidewalls 11*a* and 11*b*, a guide shaft 21 is disposed so as to extend in the left and right direction as can be seen in FIGS. 1 and 2. The guide shaft 21 is disposed so as to be parallel with the drive roller 12 and the pinch roller 13. The guide shaft 21 extends through the upper portion of the carriage 20, that is, through a later described insert hole 22. The carriage 20 is thus allowed to slide along the guide shaft 21 so as to be guided by the guide shaft 21.

Still referring to FIGS. 1 and 2, on the rear portion of cutting apparatus 1, and more specifically on the left sidewall 11*a*, an L-shaped second mount frame 24 is provided. Disposed on the second mount frame 24 is an X-axis motor 26 and a second deceleration gear 27. The X-axis motor 26 comprises, for example, a stepper motor. The X-axis motor 26 is secured on the underside of the second mount frame 24. As shown in FIG. 1, a rotary shaft 26*a* of the X-axis motor 26 extends through the second mount frame 24 and has drive gear 27*a* attached to its tip. The drive gear 27*a* meshes with a follower gear 27*b* located in front of it. The follower gear 27*b* is supported rotatably by the second mount frame 24. The drive gear 27*a* and follower gear 27*b* constitute the second deceleration gear mechanism 27. On the upper surface of the follower gear 27*b*, a pulley 28 is provided which rotates integrally with the follower gear 27*b*. Below the X-axis motor 26, an X-axis encoder 68 is provided which will be later described. On the right side upper surface of the first mount plate 14 as viewed in FIG. 2, a pulley 29 is mounted rotatably. The timing pulleys 28 and 29 are wound with an endless timing belt 31. The endless timing belt 31 is connected to a later described mount portion 30 shown in FIG. 3B located on rear portion of the carriage 20.

When the X-axis motor 26 is driven in rotation in the forward and reverse directions, the rotary motion is transmitted to the timing belt 31 by way of the second deceleration gear mechanism 27 and the pulley 28. As a result, the carriage 20 as well as the cutter holder 5 are transferred in the left and right direction. The carriage 20 and the cutter holder 5 are thus, transferred in the X direction which is orthogonal to the Y direction in which the workpiece 6 is fed. The components such as the guide shaft 21, the X-axis motor 26, the second deceleration gear mechanism 27, the pulley 28, the pulley 29, the timing belt 31, and the carriage 20 constitute the second transfer unit 8.

Figure 3B:
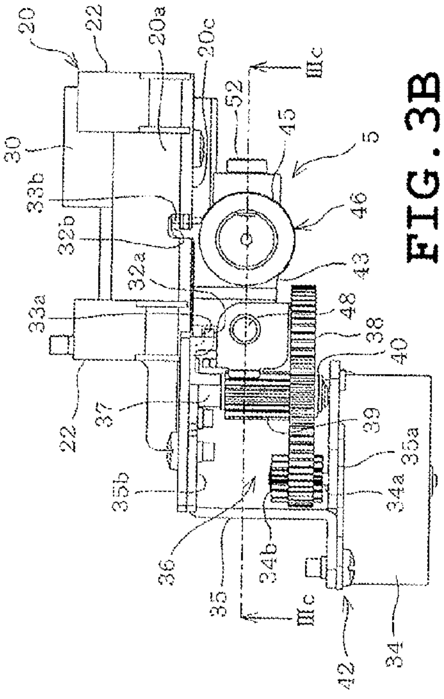
FIGS. 3A and 3B are examples of a front view and a plan view of a carriage and a cutter holder.
Figure 3A:
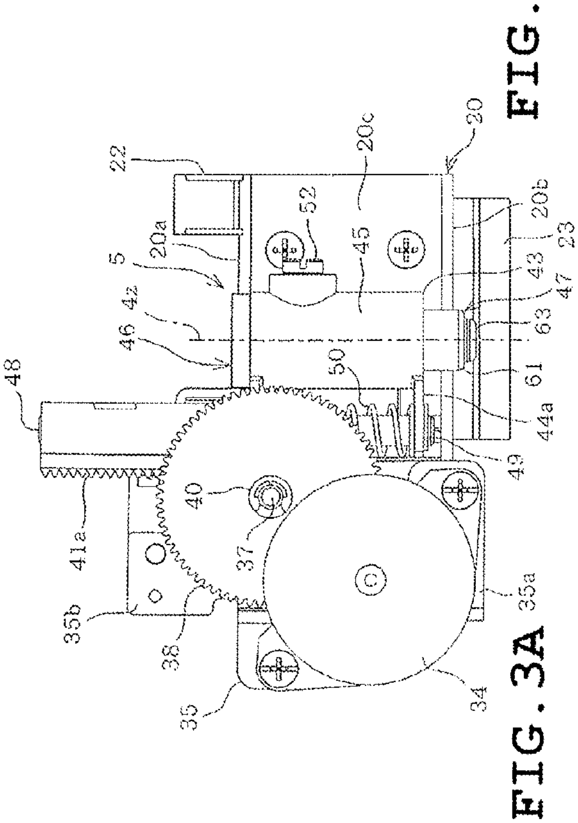

The cutter holder 5 is disposed on the front side of the carriage 20 and is supported by the carriage 20 so as to be movable in the up and down direction, also referred to as the Z direction or a third direction. As shown in FIGS. 3A and 3B, the carriage 20 is provided with a front wall 20*c* which is substantially rectangular. The upper end portion and the lower end portion of the front wall 20*c* are bent reward to define an upper edge 20*a* and a lower edge 20*b* of the carriage 20. On the upper edge 20*a* of the carriage 20, a pair of left and right projections is formed so as to protrude upward. The left and right projections are each provided with an insert hole 22 through which the guide shaft 21 is inserted. On the lower edge 20*b* of the carriage 20, guide subject 23 is provided so as to be structurally integral with the lower edge 20*b*. The guide subject 23 extends in the left and right direction and has a substantially U-shaped cross section in which the opening of the U-shape faces downward. The guide subject 23 is engaged with the pinch roller 13 so as to be slidable in the left and right direction along the pinch roller 13 and such that the guide subject 23 is located above the pinch roller 13. Further, the front wall 20*c* of the carriage 20 is provided with the mount portion 30 described earlier that protrudes rearward. The mount portion 30 is connected to the timing belt 31. The carriage 20 is supported slidably in the left and right direction by the guide shaft 21 inserted through the insert holes 22. The carriage 20 is inhibited from pivoting about the guide shaft 21 by the slidable engagement between the guide subject 23 and the pinch roller 13.

Referring to FIG. 3B, a first engagement portion 32*a* and a second engagement portion 32*b* are provided on the front wall 20*c* of the carriage 20. The first engagement portion 32*a* and the second engagement portion 32*b* extend in the up and down direction on the front wall 20*c*. The first engagement portion 32*a* and the second engagement portion 32*b* engage with a later described first engagement subject 33*a* and a second engagement subject 33*b* of cutter holder 5.

As shown in FIG. 1 and FIG. 3B, etc., a third mount frame 35 formed into a crank shape is provided on the left side portion of the front wall 20*c* of the carriage 20. The Z-axis motor 39 and a third deceleration gear mechanism 36 are disposed on the third mount frame 35. The Z-axis motor 34 comprises, for example, a stepper motor. The z-axis motor 34 is secured on the front face of a mount piece 35*a* disposed on the front side of the third mount frame 35. As shown in FIG. 3B, a rotary shaft 34*a* of the Z axis motor 34 penetrates through the mount piece 35*a*. On the tip of the rotary shaft 34*a* of the Z-axis motor 34, a drive gear 34*b* is attached. The third mount frame 35 is further provided with amount piece 35*b* on its rear side and a gear shaft 37 protrudes forward from the mount piece 35*b*. An intermediate gear 38 and a pinion 39 are mounted rotatably on the gear shaft 37. The pinion 39 is relatively smaller in diameter as compared to the intermediate gear 38. A stop ring 40 is secured on the front end of the gear shaft 37 to prevent the dislocation of the gear shaft 37. The intermediate gear 38 meshes with the drive gear 34*b*. The pinion 39 and the intermediate gear 38 are structurally integral. The drive gear 34*b*, the intermediate gear 38, and the pinion 39 constitute the third deceleration gear mechanism 36.

As shown in FIGS. 3A to 3C, a holder body 43 of the cutter holder 5 is provided with a shaft container 44 and a cylindrical portion 45 that are structurally integral with the holder body 43. The shaft container 44 constitutes the left side half of the holder body 43 whereas the cylindrical portion 45, being stepped down relative to the shaft container 44, constitutes the right side half of the cylindrical body 43. The shaft container 44 extends in the up and down direction. As shown in FIG. 3B, the first engagement subject 33*a* is provided on a rear side wall of the shaft container 44 and the second engagement subject 33*b* is provided on a rear sidewall of the cylindrical portion 45. The holder body 43 is assembled with the carriage 20 so as to lower the holder body 43 into engagement with the carriage 20 while placing the first engagement subject 33*a* in engagement with the first engagement portion 32*a* and the second engagement subject 33*b* in engagement with the second engagement portion 32*b*, respectively. Thus, the holder body 43 is supported by the carriage 20 so as to be movable in the up and down direction relative to the carriage 20.

Referring to FIG. 3C, the shaft container 44 of the holder body 43 is provided with a mount shaft 48. The mount shaft 48 extends in the up and down direction through a bottom wall 44*a* and an upper wall 44*b* of the shaft container 44. The mount shaft 48 is provided with a pair of upper and lower stop rings 49 that are disposed so as to hold the lower wall 44*a* and the upper wall 44*b* therebetween. The mount shaft 48 is secured to the holder body 43 by the stop rings 49. On the left side of the mount shaft 48, a rack forming member 41 is disposed. The rack forming member 41 is provided with a rack 41*a* and a pair of mount pieces 41*b* and 41*c* extending rightward from the rack 41*a*. The rack 41*a* and the pair of mount pieces 41*b* and 41*c* are structurally integral with the rack forming member 41. Rack 41*a* extends in the up and down direction along the mount shaft 48. The rack 41*a* meshes with the pinion 39 of the third deceleration gear mechanism 36. The pair of mount pieces 41*b* and 41*c* extends rightward from the upper end portion and the mid portion of the rack 41*a* respectively.

The rack forming member 41 is mounted on the mount shaft 48 extending through the mount pieces 41*b* and 41*c* so as to be movable in the axial direction of the mount shaft 48. The rack forming member 41 is disposed such that mount piece 41*c* provided on its mid portion is located below the upper wall 44*b*. Further, compression coil spring 50 is wound on the portion of mount shaft 48 located between mount piece 41*c* of the rack forming member 41 and the bottom wall 44*a* of the shaft container 44.

Figure 4:
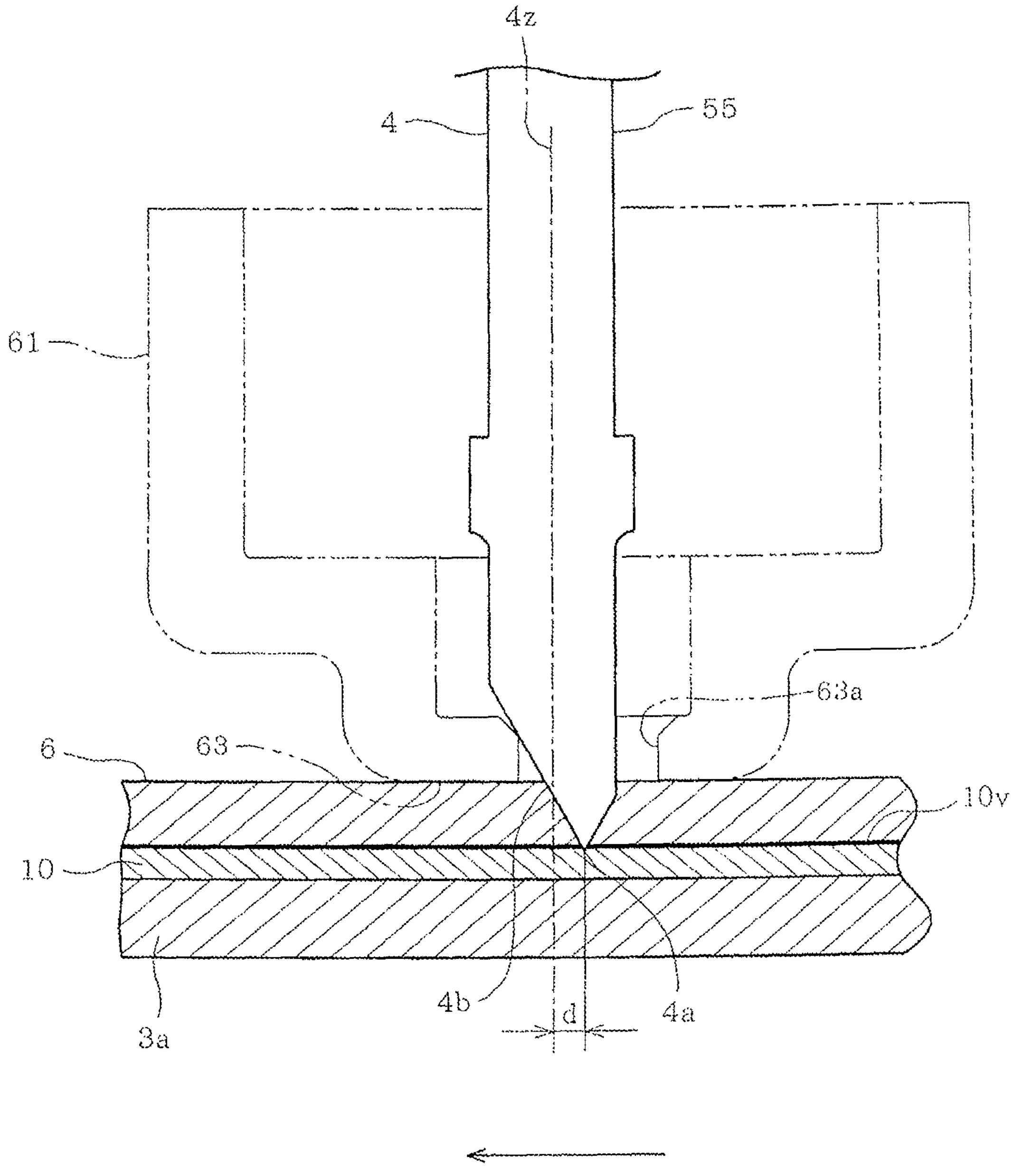
FIG. 4 is one example of an enlarged view showing the portion near the tip of a cutter when a cutting operation is ongoing.

The rack 41*a* of the rack forming member 41 meshes with the pinion 39 of the third deceleration gear mechanism 36. Thus, when the Z-axis motor 34 is driven in the forward or reverse directions, the drive force is transmitted to the rack forming member 41 by way of the drive gear 34*b*, the intermediate gear 38, and the pinion 39. Thus, the holder body 43 and consequently the cutter holder 5 are moved between the lowered position and the lifted position. When the cutter holder 5 is in the lowered position, a blade 4*b* of the cutter 4 penetrates through the workpiece 6 as shown in FIG. 4. When the cutter holder 5 is in the lifted position, the blade 4*b* is spaced apart from the workpiece 6 by a predetermined distance as shown in FIGS. 2, 3A, 3C.

When the cutter holder 5 is in the lowered position, the compression coil spring 50 below the mount piece 41*c* of the rack forming member 41 becomes downwardly compressed. Thus, biasing force, in other words, the elasticity of the compression coil spring 50 exerts a predetermined pressure which is applied to the workpiece 6 by way of the cutter 4. The compression coil spring 50 also allows the upward movement of the cutter holder 5 and consequently the cutter 4 against the biasing force. The components such as the third deceleration gear mechanism 36, the Z-axis motor 34, and the rack forming member 41 constitute a third transfer unit 42 that transfers the cutter holder 5 in the up and down direction. Thus, the cutter holder 5 is moved relative to the workpiece 6 by the first transfer unit 7, the second transfer unit 8, and the third transfer unit 42.

The cutter holder 5 is provided with a support device 46 and a pressure device 47. The support device 46 is disposed on the cylindrical portion of the holder body 43 and is configured to support the cutter 4 so as to be rotatable about the Z-axis. The pressure device 47 is configured to depress the workpiece 6.

Referring to FIG. 3C, the support device 46 is provided with a support base member 51 which is substantially cylindrical and which is provided inside the cylindrical portion 45 of the holder body 43. On the upper end portion of the support base member 51, a flange 51*a* is formed. The flange 51*a* projects radially outward so as to be supported by the upper end of the cylindrical portion 45. The support base member 51 is inserted into the cylindrical portion 45 from the upward direction and is fastened to the holder body 43 by a screw 52. The screw 52 radially penetrates the cylindrical portion 45 at a location just above the mid portion of the cylindrical portion 45 to lock the support base member 51 in place.

In the lower end interior of the support base member 51, a bearing member 54 is provided. In the upper half interior of the support base member 51, a bearing portion 51*b* is formed so as to be structurally integral with the support base member 51. The bearing portion 51*b* is in sliding contact with the outer peripheral surface of the cutter shaft 55 of the cutter 4. The bearing member 54 and the bearing portion 51*b* constitute a bearing unit that rotatably supports the cutter 4 about its central axis 4*z*.

The cutter 4 comprises a cutter shaft 55 in the shape of round bar and the blade 4*a* formed at the lower end of the cutter shaft 55 that are structurally integral. As can be seen in FIG. 4, the blade 4*b* is sharpened at an angle toward the workpiece 6. The lowermost tip 4*a* of the blade 4*b* is eccentric by distance d from the central axis 4*z* of the cutter shaft 55. The height of the cutter 4 is adjusted so that the blade 4*b* penetrates through the workpiece 6 and possibly into the underlying holding sheet 10 but does not reach the upper surface of the platen 3*b* when the cutter holder 5 is moved to the lowered position.

On the lower portion of the cutter 4 near the blade 4*b*, a support member 53 is provided which is shaped like a stepped cylinder as shown in FIG. 3C. The support member 53 has an insert hole 58 penetrating axially through its center. The support member 53 establishes a fitting engagement with the cutter 4 by pressing the cutter shaft 55 into the insert hole 58

The upper end of the support member 53 is fitted into the bearing member 54. Thus, the cutter 4 being fitted with the support member 53 is supported by the bearing member 54 and the bearing portion 51*b* so as to be rotatable with respect to the support base member 51. On the outer peripheral side of the insert hole 58 of the support member 53, a spring receiving groove 53 is provided. The spring receiving groove 53*a* is coaxial with the insert hole 58 and is formed so as to extend upward from the lower surface side of the support member 53. The spring receiving groove 53*a* receives the upper half of a compression coil spring 60 later described. The support base member 51, the bearing member 54, and the support member 53 constitute the support device 46 that supports the cutter 4 rotatably about the central axis 4*z*.

The pressure device 47 is provided with a presser member 61 and a compression coil spring 60. The presser member 61 is configured to depress the workpiece 6 and is made of resin material. The compression coil spring 60 elastically biases the presser member 61 toward the workpiece 6.

The presser member 61 is formed as a cylindrical container with an enclosed bottom and is configured to receive the lower portion of the support member 53. The bottom central portion of the presser member 61 protrudes downward to serves as a contact portion 63. The bottom surface of the contact portion 63 is a round planar surface lying on a horizontal plane. The bottom surface of the contact portion 63 is configured to establish surface contact with the workpiece 6. As shown in FIG. 4, the contact portion 63 has a through hole 63*a* extending through it in the up and down direction. The through hole 63*a* is dimensioned so as to be slightly larger than the cross section of the cutter 4 to allow the smooth insertion of the blade 4*b* into the through hole 63*a*.

As shown in FIG. 3C, the compression coil spring 60 is disposed between the upper portion of the presser member 61 and the spring receiving groove 53*a* of the support member 53. The presser member 61 is provided with a lock portion not shown that prevents the disengagement of the support member 53. The presser member 61 and the coil spring 60 are attached to the support member 63 from the lower side. Thus, when the cutter holder 5 is in the lifted position, the cutter 4 is stored inside the presser member 61 such that the blade 4*b* is not exposed as shown in FIGS. 3A and 3C. In contrast, when the cutter holder 5 is in the lowered position, the presser member 61 is biased toward the workpiece 6 by the compression coil spring 60 to depress the workpiece 6 with a predetermined biasing force.

Figure 5B:
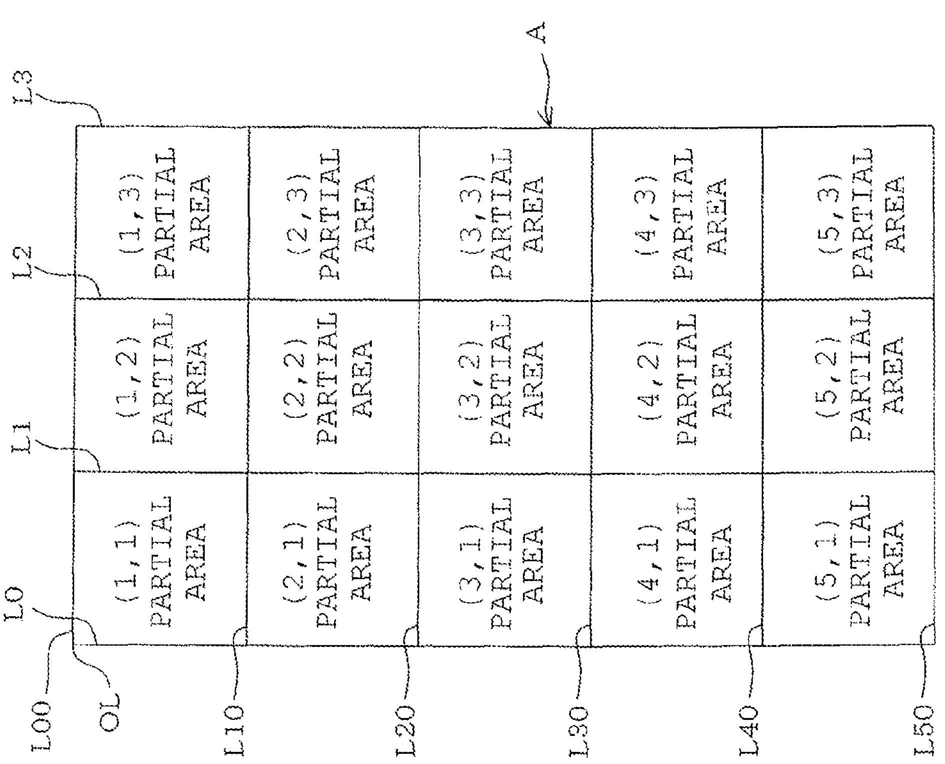
FIG. 5B illustrates one example of a correlation between a cuttable area shown on a display and the holding sheet illustrated in FIG. 5A.
Figure 5A:
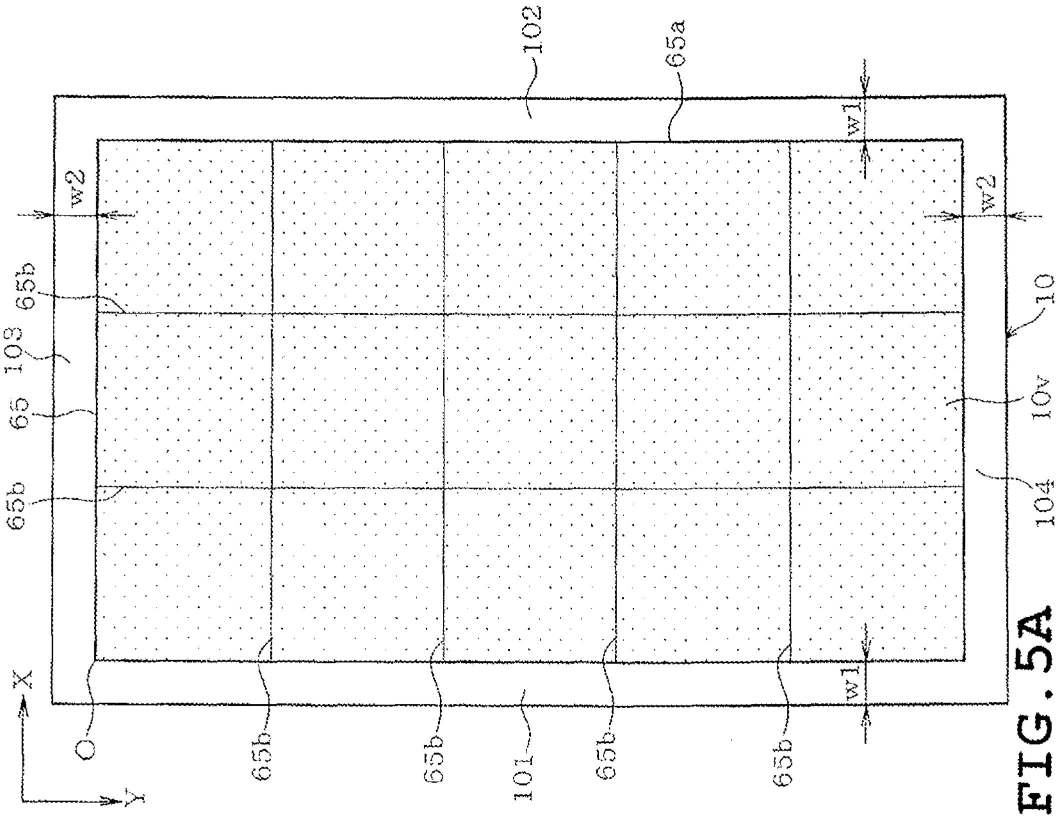
FIG. 5A is one example of a plan view of a holding sheet.

Next, a description will be given on the holding sheet 10 with reference to FIG. 5A. The holding sheet 10 comprises a holding member made of materials such as resin and is substantially rectangular. The holding sheet 10 is provided with an adhesive layer 10*v* on its upper surface opposing the cutter 4 as shown in FIG. 4. The adhesive layer 10*v* is formed in an area within the holding sheet 10 which is spaced inward by a predetermined distance, indicated as W1 and W2 in FIG. 5A, from the outer edge of the holding sheet 10. As shown in FIG. 5A, the adhesive layer 10*v* is substantially rectangular in plan view and comprises a transparent adhesive material removably holding various types of workpiece 6. The adhesive force of the adhesive layer 10*v* is controlled to a relatively weak level to allow the workpiece 6 to peel easily without ripping. The workpiece 6, when being cut by the cutting apparatus 1, is held unmovably with respect to the holding sheet 10 by the adhesive force of the adhesive layer 10*v* and the pressure applied by the presser member 61.

On the peripheral edge of the holding sheet 10, a left edge portion 101, a right edge portion 102, a rear edge portion 103, and a front edge portion 104 are provided as areas free of the adhesive layer 10*v*. The left edge portion 101 and the right edge portion 102 each serves as a support subject portion being supported by the pressure applied by the underlying depressors 12*a* and 12*b* of the drive roller 12 and the overlying depressors 13*a* and 13*b* of the pinch roller 13. The holding sheet 10 is provided with base line 65 that delineates the area occupied by the adhesive layer 10. Base line 65 comprises a first base line 65*a* and second base line 65*b* shown in FIG. 5A. The first base line 65*a* is shaped as a rectangular frame outlining the outer edge of the adhesive layer 10*a*. The second base line 65*b* delineates the adhesive layer 10*v* into partitions of a predetermined sized. These base lines 65*a* and 65*b* may be printed on the upper surface of the holding sheet 10. The base lines 65*a* and 65*b* can be seen through the transparent adhesive layer 10*v*.

The area occupied by the adhesive layer 10*v* is defined as a cuttable area. The cuttable area is divided into n number of areas counted in the front and rear direction and into m number of areas counted in the left and right direction. Thus, the cuttable area is delineated into n×m number of areas identified as (1, 1) partial area to (n, m) partial area. In the example shown in FIG. 5A, the second base line 65*b* divides the inner bounds of the first base line 65*a*, that is, the area occupied by the adhesive layer 10*v* into 5 areas in the front and rear direction and into 3 areas in the left and right direction in equal spacing. The 15 partial areas thus formed are identified as (1, 1) partial area to (5, 3) partial area as shown in FIG. 5B. The partial areas (1, 1) to (5, 3) are each identical in shape and size. The base line 65 forms a lattice partition pattern on the holding sheet 10 in the above described example. Hence, the base line 65 serves as a reference in the location and the size of the workpiece 6 to be attached to the adhesive layer 10*v*. The shape and the partition pattern of the holding sheet 10 are not limited to the shown shape and pattern but may be formed into any given pattern or shape to divide the cuttable area.

The cutting apparatus 1 is provided with a detection sensor 66 shown in FIG. 6 that detects the holding sheet 10 set through the opening 2*a*. The cutting apparatus 1 is further provided with a control circuit 71 which assigns origin (X0, Y0) to point "O" of the set holding sheet 10 shown in FIG. 5A based on the detection signal of the detection sensor 66. Thus, the cutting apparatus 1 defines an X-Y coordinate system based on origin O of the holding sheet 10. The cutting apparatus 1 moves the cutter 4 and the workpiece 6 relative to one another on the X-Y coordinate system through control of the Y-axis motor 15 of the first transfer unit 7 and the X-axis motor 26 of the second transfer unit 8 based on the later described cut data. As indicated in FIG. 5B, the coordinate system of the cutting apparatus 1 is configured such that the X-axis extends from the left to right starting from the origin O located on the upper left corner of the holding sheet 10, whereas the Y-axis extends from the rear side to the front side starting from the origin O. Thus, the X-axis value increases toward the right side of the holding sheet 10 and the Y-axis value increases toward the front side of the holding sheet.

The coordinate indicating the current position of the cutter 4 is calculated based on the detection signals of the X-axis encoder 68 and the Y-axis encoder 67. The X-axis encoder 68 and the Y-axis encoder 67 are ordinary encoders known in the art and thus will not be described in detail. The X-axis encoder 68 detects the amount of rotation and the direction of rotation of the X-axis motor 26, whereas the Y-axis encoder 67 detects the amount of rotation and the direction of rotation of the Y-axis motor 15. The detection signals of the X-axis encoder 68 and the Y-axis encoder 67 are outputted to the control circuit 71. Based on the detection signals, the control circuit 71 calculates the amount of X-directional movement of the cutter 4 by the second transfer unit 8 and the amount of Y-directional movement of the holding sheet 10 by the first transfer unit 7.

The control circuit 71 thus, calculates the coordinate indicating the current location of the cutter 4 on the holding sheet 10 as well as controlling the motors 15 and 26 while monitoring the X-directional and the Y-directional movement of the cutter 4. In the present configuration, the motors 15 and 26 employ a stepper motor also known as a pulse motor. Thus, the current location of the cutter 4 may be detected based on the pulse count of drive pulse given to the motors 15 and 26 as command values. Such arrangement allows the encoders 67 and 68 to be eliminated and thus, simplifies the overall configuration.

Next, a description will be given on a control system of the cutting apparatus 1 with reference to the block diagram illustrated in FIG. 6.

The control circuit 71 responsible for the overall control of the cutting apparatus 1 is primarily configured by a computer (CPU) and is coupled to a ROM 72, RAM 73, EEPROM 74, and an external memory 75. ROM 72 stores various types of computer programs such as a cut control program for controlling the cut operation executed by the cutting apparatus 1 and a control program for controlling the image output through display 9*a*. The RAM 73 is a temporary storage for storing data and programs used in executing various processes. External memory 75 stores cut data used in the cutting patterns with the cutting apparatus 1. As will be later described in detail, EEPROM 74 stores number of cuts made in a pattern for each partial area.

The control circuit 71 is connected to various control switches 9*b*, detection sensor 66. The controller 71 is further connected to the display 9*a* by way of drive circuit 79. The display 9*a* outputs various items such as a later described pattern selection screen not shown and a cut history screen shown in FIG. 9. The user may select a desired pattern, etc. through the operation of various control switches 9*b* while viewing the display 9*a*. The control circuit 71 is further connected to drive circuits 76, 77, and 78 for driving the Y-axis motor 15, the X-axis motor 26, and the Z-axis motor 34, respectively. The control circuit 71 controls the Y-axis motor 15, the X-axis motor 26, and the Z-axis motor 34 through the execution of the cut control program to automatically execute the cutting of the workpiece 6 located on the holding sheet 10.

The cut data stored in the external memory 64 includes basic size information, cut line data, and display data. The basic size information contains the longitudinal and latitudinal sizes of a pattern and is represented as a virtual rectangular frame data that surrounds the pattern. For example, in pattern S depicting a "star" in FIG. 7B, the basic size information is represented by the size of rectangular frame F surrounding the pattern so as to contact vertexes $P_0$ to $P_{10}$.

The cut line data comprises coordinate data indicating the vertexes of the cut line comprising multiple line segments located in the XY coordinate system. In the example shown in FIG. 7B, the cut line of pattern S comprises line segments S1 to S10. The cut line, formulated by the line segments S1 to S10, exhibits a closed star shape in which a cut start point $P_0$ and a cut endpoint $P_{10}$ are coincidental. The cut line data of pattern S includes a first coordinate (X1, Y1), a second coordinate (X2, Y2), a third coordinate (X3, Y3), . . . , and eleventh coordinate data (X11, Y11) corresponding to cut start point $P_0$, vertex $P_1$, vertex $P_2$, vertex $P_3$, . . . , cut end point $P_{10}$. The coordinates are plotted, for example, based on a coordinate origin $W_0$ located at the upper left corner of rectangular frame F shown in FIG. 7B. Coordinate origin $W_0$ is associated with origin O of the holding sheet 10 and the cutting operation is performed based on the cut line data.

When cutting pattern S by the cutting apparatus 1, the cutter 4 is relatively moved to the XY coordinate representing the cut start point $P_0$ of pattern S. The relative movement of the cutter 4 is achieved by the Y-directional movement of the holding sheet 10 and consequently the workpiece 6 by driving the Y-axis motor 15 and by the X-directional movement of the cutter holder 5 by driving the X-axis motor 26. Then, the blade 4*b* of the cutter 4 is pierced through cut start point $P_0$ located on the workpiece 6. Then, the cutter 4 is relatively moved toward the end point $P_1$ of line segment S1 by the Y-axis motor 15 and the X-axis motor 26 to cut the workpiece 6 along line segment S1. The cutting of the subsequent line segment S2 starts from the end point $P_1$ of the preceding line segment S1 and proceeds continuously in the same manner. The cutting of segments S2 to 10 proceeds continuously in sequence to cut along the cut lines of pattern S, i.e. the "star" based on the cut line data.

In the present configuration, the number of cuts made by the cutter 4 on a pattern within the cuttable area of the holding sheet 10 is counted for each partial area. The "cuttable area" is an area in which the workpiece 6 attached to the adhesive layer 10*v* of the holding sheet 10 is cuttable. The cutting apparatus 1 also defines the cuttable area as a collection of multiple subdivided partial areas.

The rectangular area illustrated in FIG. 5B represents cuttable area A which is outputted on display 9*a*. EEPROM 74 stores partial area information that identifies each of the partial areas. More specifically, the partial area information is configured by line segment data of base lines L0, L1, L2, and L3 extending longitudinally in FIG. 5B and line segment data of base lines L00, L10, L20, L30, L40, and L50 extending laterally in FIG. 5B. The foregoing line segments are associated with base line 65 of the holding sheet 10. Alternatively, the line segment data may be configured by coordinate data plotted at the intersection of base lines L0 to L3 and base lines L00 to L50, in other words, the coordinates plotted at the 4 corners of each of (1, 1) partial area to (5, 3) partial area. The partial area information is arranged based on coordinate origin OL corresponding to origin O of the holding sheet 10. The partial area information also contains data for displaying purposes.

Thus, (1, 1) partial area to (5, 3) partial area on the holding sheet 10 are represented by coordinates associated with base lines L0 to L3 and L00 to L50 that delineate cuttable area A. Further, (1, 1) partial area to (5, 3) partial area are defined by the coordinate system of the cutting apparatus 1 based on origin O of the holding sheet 10. The partial area information may vary the number of partitions of cuttable area A depending upon the number of partitions given by n×m. Cuttable area A is shown in the appropriate size as shown FIG. 9.

Figure 9:
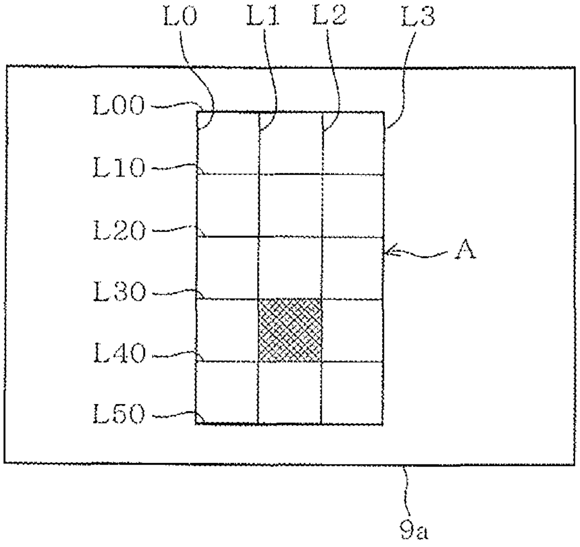
FIG. 9 is one example of cut history screen.

Referring to FIG. 8, number of cuts made on the pattern in (1, 1) partial area to (5, 3) partial area are indicated as cut counts cnt1 to cnt15. More specifically, control circuit 71 calculates the coordinate of the current location of the cutter 4 based on the detection signals of the encoders 67 and 68 during the cutting of the pattern. At this instance, the control circuit 71 refers to the partial area information associated with the coordinate of the current location of the cutter 4. Thus, the control circuit 71 increments the cut count cnt1 by 1 when judging that cutting of pattern S is performed on pattern S in (1, 1) partial area. As described above, cut counts cnt1 to cnt15 are counted by the control circuit 71 for each of the partial areas associated with (1, 1) partial area to (5, 3) partial area. The counted cut counts cnt1 to cnt15 are stored in EEPROM 74 as cumulative values for each partial area. Further, information pertaining to cut counts cnt1 to cnt15 is outputted on the screen shown on display 9*a* along with (1, 1) partial area to (5, 3) partial area within cuttable area A. The information pertaining to cut counts cnt1 to cnt15 provides a reference to the user in specifying the location in which the pattern is to be cut. More specifically, as will be later described in the working of the foregoing configuration, the control circuit 71 verifies cut counts cnt1 to cnt15 and identifies or specifies a specific partial area within cuttable area A which is preferable or recommended for cutting the pattern. The recommended area is highlighted in a color distinguished from the color of other areas within the cut history screen as illustrated in FIG. 9. Thus, the user is informed of the preferable location within the holding sheet 10 for cutting the workplace 6.

The above described control circuit 71 is one example of a counting unit that counts the number of cuts made on the pattern, i.e. cut counts cnt1 to cnt15 for each of the partial areas. EEPROM 74 is one example of a nonvolatile storage that stores the counts with a mapping to each of the partial areas. The control circuit 71, display 9*a,* and drive circuit 79 are examples of a notifying unit and a display unit that notifies information pertaining to the cut count for each of the partial areas.

Next, a description will be given on the working of the above described configuration with reference to FIG. 11.

Figure 11:
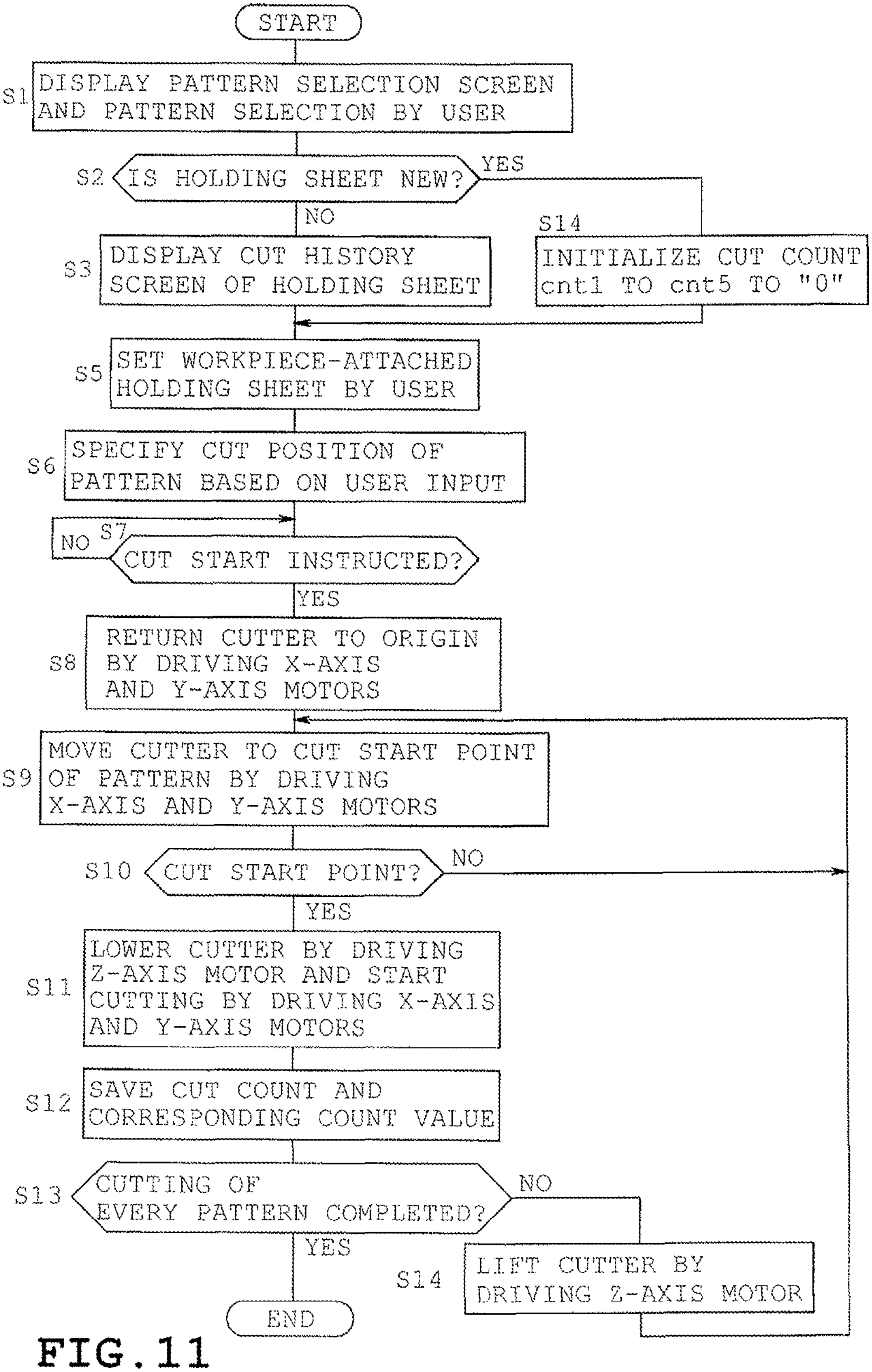
FIG. 11 is a flowchart indicating one example of a process flow for counting the number of cuts and displaying the obtained count during the cutting operation.

The flowchart of FIG. 11 indicates the process flow of a control program executed by the control circuit 71.

The process of control program starts by turning on the power of the cutting apparatus 1. By the user operation of the control switches 9*b,* a pattern selection screen not shown is outputted/displayed on the display 9*a* for pattern selection. The user is to select the desired pattern, which, in this example is pattern S representing a "star" by operating the control switches 9*b* (step S1). As a result, cut data of the selected pattern S is read from the external memory 75 and loaded into the RAM 73.

The display 9*a* outputs an input screen not shown for making inputs pertaining to the holding sheet 10. The input screen 10 presents selection of items pertaining to the holding sheet 10 such as "USE NEW SHEET" and "REUSE USED SHEET". The user is to make the applicable selection based on the status of the holding sheet 10 at hand.

Supposing that the control circuit 71 made a judgment that the holding sheet 10 is not new, i.e. not in is mint condition, based on the input made pertaining to the holding sheet 10 (step S2: NO), the control circuit 71 proceeds to verify cut counts cnt1 to cnt15 stored in the EEPROM 79. Then, based on the result of the verification, the controller 71 identifies the partial area having the least cut count within cuttable area A as the recommended area in which the cutting of pattern S is recommended. For example, if the cut count cnt11 of (4, 2) partial area indicated in FIGS. 5B and 8 is less than the cut counts cnt1 to cnt10 and cnt12 to cnt15 of other partial areas, (9, 2) partial area is identified as the recommended area.

Then, the identified (4, 2) partial area is notified by outputting the cut history screen as exemplified in FIG. 9 (step S3). The cut history screen displays the (1, 1) partial area to (5, 3) partial area constituting the cuttable area A in the appropriate size. (1, 1) partial area to (5, 3) partial area are partial areas defined by delineating cuttable area A by the base lines L0 to L3 and L00 to L50 corresponding to the base 65 of the holding sheet 10. (4, 2) partial area within the cuttable area A is colored distinctly from other partial areas on the display 9*a*. Thus, (9, 2) partial area is readily distinguishable as an area having the least number of cuts, meaning that cut count cnt 11 is the least among other cut counts. The above described configuration allows the user to find the area in which pattern S should be cut within the holding sheet 10 at a glance. In case the holding sheet 10 at hand is new (step 82: YES), cut counts cnt1 to cnt15 stored in the EEPROM 74 are completely initialized (step S4). When initialized, "0" is assigned to all of cut counts cnt 1 to cnt 15.

Figure 10:
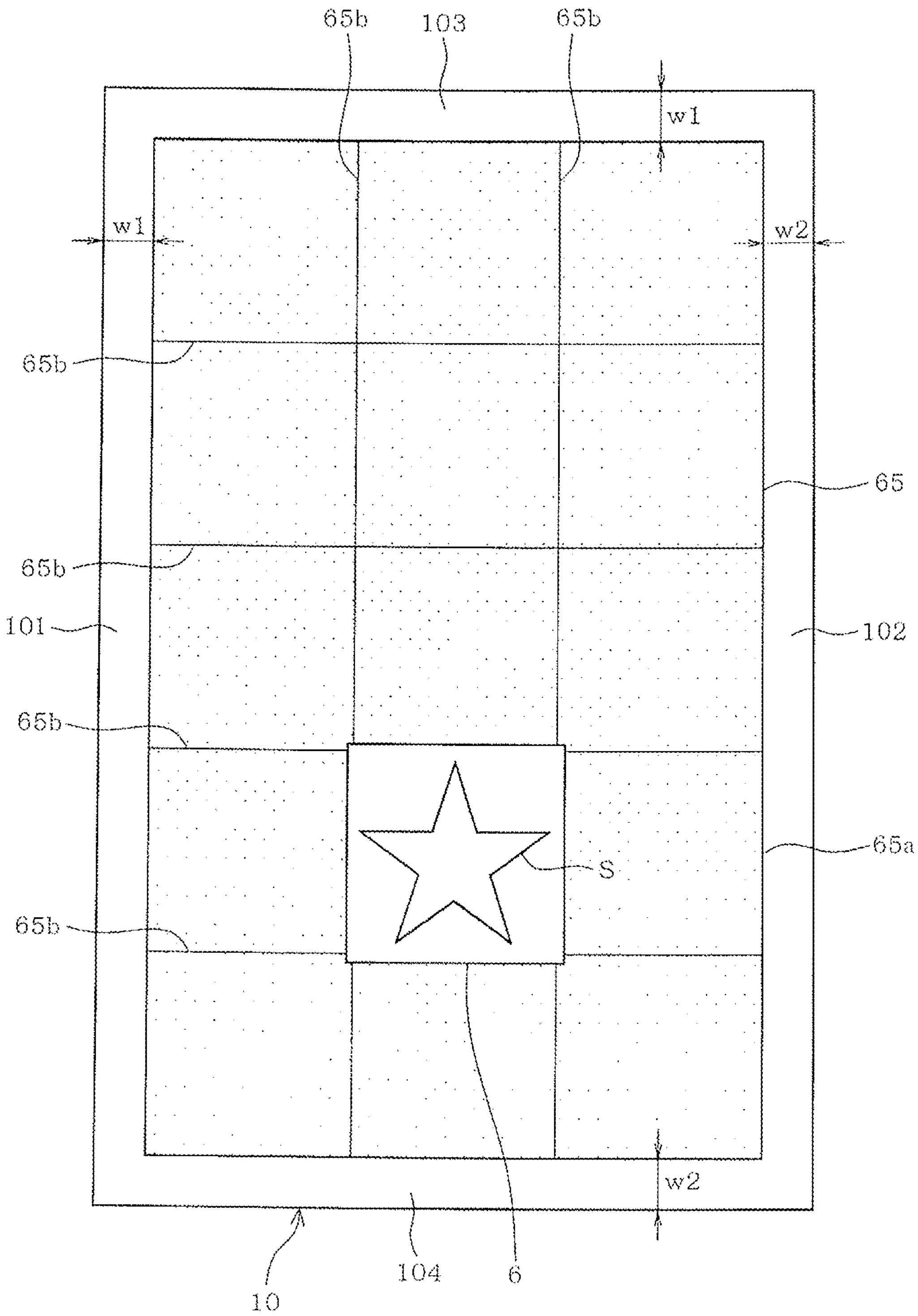
FIG. 10 is one example of a workpiece, having been subjected to a cutting operation, shown with the holding sheet.

Next, the user is to attach the workpiece 6 which may be various types of sheet materials such as paper, cloth, and resin film onto the adhesive layer 10*v* of the holding sheet 10. The workpiece 6 may come in a size that covers the entire area of the adhesive layer 10*v* as shown in FIG. 1. Alternatively, workpiece 6 suitably sized with pattern S may be attached to (4, 2) partial area as shown in FIG. 10. Then, the holding sheet 10 holding the workpiece 6 is inserted into the opening 2*a* of the cutting apparatus 1 and instructions are given through the operation of the controls switches 9*b* to "SET" the holding sheet 10 for execution of the cutting operation. The control circuit 71 responsively feeds the holding sheet 10 rearward by driving the Y-axis motor 15 and origin O is specified to the holding sheet (step S5) based on the detection signal outputted by the detection sensor 66 as the result of detection performed on the holding sheet 10.

The display 9*a* outputs a partial area selection screen not shown for selecting the location for cutting pattern S. The partial area selection screen shows cuttable area A corresponding to the base line 65 located on the holding sheet 10 and being suitably sized as was the case in the cut history screen. Area identification numbers such as (1, 1) to (5, 3) associated with each of the partial areas may also be presented in the cuttable area A shown in the display 9*a*. Then, the user is to specify the area identification number (step S6) associated with (4, 2) partial area from the area identification numbers (1, 1) to (5, 3) by operating the control switch 9*b* while viewing the partial area selection screen. The control circuit 71 designates the location of pattern S with respect to the workpiece 6 such that the designated location corresponds to the specified (4, 2) partial area. Based on the partial area information, the control circuit 71 modifies the coordinates of the cut data so that the virtual rectangular frame F of pattern S is contained within (4, 2) partial area. Then, the control circuit 71 stores the modified coordinates in the RAM 73.

Figures 7A, 7B:
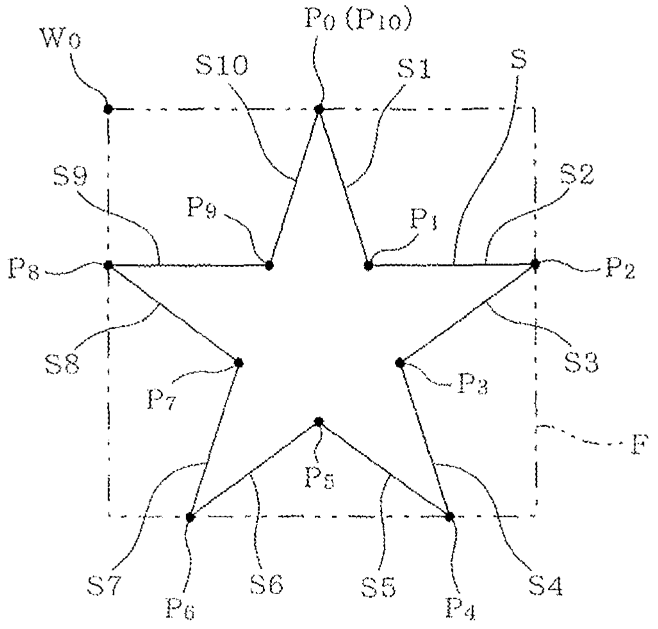
FIG. 7A is one schematic example of a data structure of cut data of a given pattern.
FIG. 7B is one example of a diagram for explaining the cut data of the pattern.

Then, instruction for staring the cutting operation is given by the user operation of the control switches 6*b* (step S7: YES). The control circuit 71 begins the cutting operation by driving the Y-axis motor 15 and the X-axis motor 26 to return the cutter holder 5 to the origin. As a result, the blade 4*b* of the cutter 4 is located over origin O (step S8). Then, the Y-axis motor 15 and the X-axis motor 26 are driven to move the blade 4*b* of the cutter 4 to the cut start point $P_0$ of the workpiece 6 as shown in FIG. 7B. The cutter 4 and the workpiece 6 are relatively moved in the X and Y directions with the cutter 4 and the workpiece 6 being spaced apart in the up and down direction (step S9).

The control circuit 71 calculates the coordinate of the cutter 4 and controls the drive of the Y-axis motor 15 and the X-axis motor 26 based on the detection signal of the X-axis and the Y-axis encoders 66 and 67. The control circuit 71 moves the cutter holder 5 to the lowered position by driving the Z-axis motor 34 once the cutter 4 has been transferred to the cut start point $P_0$ (step S10: YES). As a result, the workpiece 6 is depressed by the contact portion 63 of the presser member 61 and the blade 4*b* of the cutter 4 is projected downward through the through hole 63*a* of the contact portion 63 to penetrate the cut start point $P_0$ the workpiece 6 as shown in FIG. 4. Then, the Y-axis motor 15 and the X-axis motor 26 are driven to relatively move the cutter 4 toward the coordinate of the end point $P_1$ of line segment S1 shown in FIG. 7B to start cutting along the line segment S1 (step S11).

When cutting of line segments S1 and S2 to S10 of the cut line for pattern S is executed continuously in sequence, the number of cuts, i.e. cut count is counted for each of the partial areas. Control circuit 71 reads the preset partial area information from the EEPROM 74 and determines the partial area in which cuts were made based on the partial area information and the coordinate of the cutter 4. Supposing that the control circuit 71 has made a judgment that cuts were made up to cut end point $P_{10}$ on pattern S within (4, 2) partial area, the cut count cnt11 associated with (4, 2) partial area is incremented by 1. Then the cut count cnt11 stored in the EEPROM 74 is updated by being overwritten by the latest cut count cnt11 after pattern S has been cut (step S12). After pattern S representing a "star" selected in step S1 has been completely cut out (step S13: YES) as shown in FIG. 10, the cutter holder 5 is moved to the lifted position. Then, the holding sheet 10 is fed forward and ejected to terminate the process.

In case one or more patterns were selected in addition to pattern S in step S1, a judgment is made at step S13 that cutting of all the patterns have not been completed yet (S13: NO). Thus, in the subsequent step S14, the cutter holder 5 is moved to the lifted position by driving Z-axis motor 34 and the process returns to step S9. Then, steps S9 to S13 are executed for the remaining pattern(s). In case the remaining pattern is another "star" being formed in (4, 3) partial area adjacent to (4, 2) partial area in which pattern S was formed, cut count cnt12 associated with (4, 3) partial area is incremented by 1 after the execution of step S9 to S13 and the updated cut count cnt12 is stored in EEPROM 74. Because control circuit 71 executes the controls of the cutting while monitoring the detection signals outputted from the encoders 67 and 68, the partial area in which the cutting was performed can be determined reliably with accuracy.

As the cutting operation is repeated, scratches of the cutter 4 accumulate on the surface of the holding sheet 10 and thus, it becomes gradually difficult to cut the workpiece 6 neatly. The adhesiveness of the adhesive layer 10*v* also degrades with use and thus, it becomes gradually difficult to provide secure hold of the workpiece 6. The holding sheet 10 is thus, a consumable which may be used up to 10 times for example. In the present configuration, the location for cutting pattern S on the workpiece 6 of the holding sheet 10 is arranged to correspond to the recommended area identified in step S3. The cutting of pattern S may be performed using the holding sheet holding a workpiece which covers the entire area of the adhesive layer 10*v* or a workpiece which is suitably sized with pattern S. Thus, scratches on the holding sheet 10 will no longer be localized and the localized degradation of adhesiveness can also be prevented, thereby allowing the holding sheet 10 to be used more number of times.

The above described step S3 and step S12 are examples of instructions for displaying or specifying a subdivided cuttable area of the workpiece 6 of the holding sheet 10. Step S12 is also one example of instructions for counting the number of cuts, i.e. cut count cnt of the pattern by the cutter 4 within the cuttable area for each partial area. Step S12 is also one example of instructions for storing the count.

Step S3 is also one example of instructions for notifying information pertaining to cut count cnt based on the count stored in the instructions for storing. Step S3 is further one example of instructions for specifying a partial area as a recommended area in which cutting of the pattern is recommended. Still further, step S3 is one example of instructions for displaying information pertaining to multiple partial areas within the cuttable area and information pertaining to cut count cnt on the display 9*a* serving as the display unit.

As described above, the control circuit 71 of the present configuration is one example of a partial area specifying unit and a counting unit which is configured to execute instructions for specifying multiple partial areas by subdividing the cuttable area and instructions for counting cut count cnt of the pattern for each of the partial areas while further executing instructions for storing the count obtained by the instructions for counting. Still further, control circuit 71 executes instructions for notifying information pertaining to cut count cnt associated with each of the partial areas through the notifying unit based on the count stored in the instructions for storing.

According to the above described configuration, when the pattern is cut, the number of cuts made on holding sheet 10 represented as cut count cnt is counted for each partial area in the instructions for counting. Information on the resulting cut count cnt for each of the partial areas is notified by the notifying unit.

Accordingly, the user is allowed to perform the cutting operation using the partial area in which cut count cnt of the holding sheet is relatively small based the information pertaining to cut count cnt notified by the cutting apparatus 1. Thus, the scratches on the holding sheet 10 will no longer be localized and the localized degradation of adhesiveness can also be suppressed, thereby suppressing the overall performance degradation of the holding sheet 10.

Control circuit 71 is one example of a recommended area specifying unit and executes instructions for specifying a partial area within the cuttable area, in which cutting of a pattern is recommended, as a recommended area based on the count stored in the instructions for storing. The control circuit 71 executes instructions for notifying a result of specification of the recommended area by the instructions for specifying the recommended area.

Accordingly, the user will readily notice the recommended partial area within the holding sheet 10. Using the recommended area, the user is allowed to perform a neat and smooth cutting operation.

Control circuit 71 executes instructions for displaying information pertaining to each of the partial areas of the cuttable area along with information pertaining to cut count cnt on the display unit which is capable of displaying various cut information described above.

Accordingly, information pertaining to out count cnt is displayed on the display unit along with information pertaining to each of the partial areas of the cuttable area. Thus, the user is able to visually recognize the cuttable area with ease.

Further, information pertaining to cut count cnt is displayed on the display unit such that the count associated with each of the partial areas is distinguishable from one another. Accordingly, the user is able to distinguish the count associated with each of the partial areas and is therefore able to grasp the status of use of the holding sheet 10 in more detail.

Still further, the count associated with each of the partial areas is displayed in color. Thus, the counts may be described in different colors in different partial areas to improve the visibility of the status of use of the holding sheet 10.

The count associated with each of the partial areas need only be displayed by at least one of numerals, characters, and colors. For instance, in the cut history screen, in addition to base lines L0 to L3 and L00 to L50 of cuttable area A illustrated in FIG. 5B, cut counts cnt1 to cnt15 associated with each of the partial areas maybe displayed instead of the area identification numbers (1, 1) to (5,3) associated with each of the partial areas. Cut counts cnt1 to cnt15 may be represented by a relative scale such as "large" and "small" indicated in characters. Still alternatively, cut counts cnt1 to cnt15 may be indicated in 3 or more colors depending upon the level of cut counts cnt1 to cnt15 associated with each of the partial areas.

The above described configuration is not limited to the above description or the referred drawings but maybe modified or expanded as follows.

In addition to the above described configuration directed to cutting apparatus 1 comprising a cutting plotter, other configurations directed to different types of apparatuses provided with a cutting feature fall within the scope of the disclosure.

The notifying unit is not limited to the display 9*a*. Information on cut count cnt may be notified by audio outputted through, for example, a speaker.

The displaying of information pertaining to cut count cnt is not limited to the above described style but may be replaced by other approaches. For example, base lines L0 to L3 and L00 to L50 indicating cuttable area A may be replaced by a table and character information such as those exemplified in FIG. 8 to distinguish each of the partial areas with a listing of cut counts cnt1 to cnt15 associated with each of the partial areas.

The partial area specifying unit being was configured to read information pertaining to multiple partial areas which was subdivided in advance, for example, in n×m partial areas. Alternatively, the user may be allowed to variably specify the "n" and "m" values.

The selection of patterns and specification of cut locations may be implemented through the display 9*a* and a touch panel not shown being provided on the front face of the display 9*a* and having multiple touch keys comprising transparent electrodes. In such case, the touch keys may be depressed by the user's fingers or a touch pen to perform not only the selection of patterns and specification of cut locations but also to perform operations such as making various parameter settings and providing instructions for executing various functionalities.

The computer readable medium storing the control program is not limited to the ROM 72 provided in the cutting apparatus 1 but may come in various forms such as a CD-ROM, flexible disk, DVD, and memory card. In such case, the control program stored in the medium provides the operation and effect that are the same as those described in the foregoing configuration when executed by the computer of the devices provided with a cutting feature.

The storage device for storing the count of cuts is not limited to EEPROM 74 but may employ other types of storage devices such as a flash memory.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A cutting plotter comprising:

a processor; and a memory storing computer-readable instructions, the instructions, when executed by the processor, causing the processor to perform:

setting a plurality of partial areas by dividing a cuttable area of a holding member, the cuttable area being an area in which a cutting object is to be detachably adhered;

counting a number of cuts by a cutting blade within the cuttable area for each of the plurality of partial areas;

storing each of count values associated with each of the plurality of partial areas in a storage portion, each of the count values being counted by the counting for each of the plurality of partial areas; and notifying, based on the count values stored in the storage portion, information relating to the number of cuts for each of the plurality of partial areas.

2. The cutting plotter according to claim 1, wherein the computer-readable instructions further causes the processor to perform:

specifying at least one partial area from the plurality of the partial areas as a specified area based on the count values stored in the storage portion, the count value of the specified area being greater than the count values of the other of the plurality of the partial areas, and wherein the notifying comprises notifying a result specified by the specifying.

3. The cutting plotter according to claim 1, wherein the notifying comprises sending a command to a display, the command indicating displaying information relating to the plurality of the partial areas and the number of cuts.

4. The cutting plotter according to claim 3, wherein the notifying comprises sending a command to the display, the command indicating displaying the count value as the information relating to the number of cuts.

5. The cutting plotter according to claim 4, wherein the notifying comprises sending a command to the display, the command indicating displaying the count value with at least one of numeral, character, and color.

6. The cutting plotter according to claim 2, wherein the notifying comprises sending a command to a display, the command indicating displaying the specified area in a condition different from that of the other of the plurality of the partial areas.

7. The cutting plotter according to claim 1, wherein the computer-readable instructions further causes the processor to perform:

determining whether the holding member is in mint condition based on an input received by an operation portion, wherein the storing comprises storing a zero value as each of the count values associated with each of the plurality of partial areas in the storage portion, when the determining has determined that the holding member is in mint condition, and wherein the notifying comprises notifying, based on the count values stored in the storage portion, information relating to the number of cuts for each of the plurality of partial areas, when the determining has determined that the holding member is not in mint condition.

8. A non-transitory computer-readable medium storing computer-readable instructions that, when executed by a processor of a cutting plotter, instruct the processor to execute steps comprising:

setting a plurality of partial areas by dividing a cuttable area of a holding member, the cuttable area being an area in which a cutting object is to be detachably adhered;

counting a number of cuts by a cutting blade within the cuttable area for each of the plurality of partial areas;

storing each of count values associated with each of the plurality of partial areas in a storage portion, each of the count values being counted by the counting for each of the plurality of partial areas;

notifying, based on the count values stored in the storage portion, information relating to the number of cuts for each of the plurality of partial areas.

9. The non-transitory computer-readable medium according to claim 8, wherein the computer-readable instructions further causes the processor to execute steps comprising:

specifying at least one partial area from the plurality of the partial areas as a specified area based on the count values stored in the storage portion, the count value of the specified area being greater than the count values of the other of the plurality of the partial areas, and wherein the notifying comprises notifying a result specified by the specifying.

10. The non-transitory computer-readable medium according to claim 8, wherein the notifying comprises sending a command to a display, the command indicating displaying information relating to the plurality of the partial areas and the number of cuts.

11. The non-transitory computer-readable medium according to claim 10, wherein the notifying comprises sending a command to the display, the command indicating displaying the count value as the information relating to the number of cuts.

12. The non-transitory computer-readable medium according to claim 11, wherein the notifying comprises sending a command to the display, the command indicating displaying the count value with at least one of numeral, character, and color.

13. The non-transitory computer-readable medium according to claim 9, wherein the notifying comprises sending a command to a display, the command indicating displaying the specified area in a condition different from that of the other of the plurality of the partial areas.

14. The non-transitory computer-readable medium according to claim 8, wherein the computer-readable instructions further causes the processor to execute steps comprising:

determining whether the holding member is in mint condition based on an input received by an operation portion, wherein the storing comprises storing a zero value as each of the count values associated with each of the plurality of partial areas in the storage portion, when the determining has determined that the holding member is in mint condition, and wherein the notifying comprises notifying, based on the count values stored in the storage portion, information relating to the number of cuts for each of the plurality of partial areas, when the determining has determined that the holding member is not in mint condition.

* * * * *